United States Patent
Yatooma et al.

(10) Patent No.: US 11,230,191 B1
(45) Date of Patent: Jan. 25, 2022

(54) VEHICLE ACTIVITY MONITORING SYSTEM

(71) Applicants: Nissan North America, Inc., Franklin, TN (US); NISSAN MOTOR CO., LTD., Yokohama (JP)

(72) Inventors: Najib Yatooma, West Bloomfield, MI (US); Munetaka Sugihashi, Kanagawa (JP)

(73) Assignees: NISSAN NORTH AMERICA, INC., Franklin, TN (US); NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 16/997,510

(22) Filed: Aug. 19, 2020

(51) Int. Cl.
| | |
|---|---|
| *B60Q 1/00* | (2006.01) |
| *B60K 35/00* | (2006.01) |
| *G08B 21/24* | (2006.01) |
| *B60J 5/04* | (2006.01) |
| *B60Q 9/00* | (2006.01) |
| *B60J 5/10* | (2006.01) |

(52) U.S. Cl.
CPC .................. *B60K 35/00* (2013.01); *B60J 5/04* (2013.01); *B60J 5/10* (2013.01); *B60Q 9/00* (2013.01); *G08B 21/24* (2013.01); *B60K 2370/152* (2019.05); *B60K 2370/157* (2019.05)

(58) Field of Classification Search
CPC ................................. B60K 35/00; G08B 21/24
USPC .............. 340/457, 425.5, 426.28, 686.1, 667
See application file for complete search history.

(56) References Cited

U.S. PATENT DOCUMENTS

| | | | |
|---|---|---|---|
| 9,734,695 B2 | 8/2017 | Henry et al. | |
| 10,246,072 B2 | 4/2019 | May et al. | |
| 10,777,068 B2 * | 9/2020 | Andrade | G08B 21/24 |
| 2011/0074565 A1 * | 3/2011 | Cuddihy | B60Q 9/00 340/457 |
| 2014/0043155 A1 * | 2/2014 | Shaw | G08B 21/22 340/457 |
| 2018/0111597 A1 * | 4/2018 | May | B60K 28/12 |
| 2019/0212443 A1 * | 7/2019 | Nomura | G01S 15/08 |

* cited by examiner

*Primary Examiner* — Tai T Nguyen
(74) *Attorney, Agent, or Firm* — Global IP Counselors, LLP

(57) ABSTRACT

A vehicle activity monitoring system includes a front door sensor configured to detect movement of the front door between closed and open positions. A vehicle component sensor is configured to detect movement of a vehicle component between closed and open positions. An alerting device is configured to provide an indication that an object has potentially been left in the area of the vehicle interior. A controller is configured to operate the alerting device to provide the indication based on the controller detecting a sequence of events in which the front door is detected to be moved to the open position prior to the vehicle component being moved to the open position. The operation of the alerting device by the controller is not based on a physical detection of a presence of the object.

20 Claims, 8 Drawing Sheets

VEHICLE ACTIVITY MONITORING SYSTEM

BACKGROUND

Field of the Invention

The present invention generally relates to a vehicle activity monitoring system. More specifically, the present invention relates to a vehicle activity monitoring system configured to monitor activity of a vehicle occupant and to provide an indication based on the detected activity of the occupant.

Background Information

Vehicle occupants, including vehicle operators and passengers, routinely use a rearward portion of a vehicle interior to load cargo and other objects to be taken to a predetermined destination. A need exists for an alert to be provided to the vehicle occupant regarding the possibility of the object being left in the vehicle.

SUMMARY

One object of the disclosure is to provide a vehicle with an apparatus or system that monitors vehicle occupant activity and based upon that activity alerts the vehicle occupant to the possibility of cargo or other objects being left in the vehicle.

In view of the state of the known technology, one aspect of the present invention is to provide a vehicle activity monitoring system. A vehicle body structure defines a vehicle interior. A vehicle front door is movably connected to the vehicle body structure for movement between an open position exposing the vehicle interior and a closed position at least partially concealing the vehicle interior. A front door sensor is configured to detect movement of the front door between the closed and open positions. A vehicle component is movably connected to the vehicle body structure for movement between a closed position at least partially concealing an area of the vehicle interior and an open position exposing the area of the vehicle interior. A vehicle component sensor is configured to detect movement of the vehicle component between the closed and open positions. An alerting device is configured to provide an indication that an object has potentially been left in the area of the vehicle interior. A controller is operably connected to each of the front door sensor, the vehicle component sensor, and the alerting device. The controller is configured to operate the alerting device to provide the indication based on the controller detecting a sequence of events in which the front door is detected to be moved to the open position prior to the vehicle component being moved to the open position. The operation of the alerting device by the controller is not based on a physical detection of a presence of the object.

Another aspect of the present invention is to provide a vehicle activity monitoring system. A vehicle body structure defines a vehicle interior. A vehicle front door is movably connected to the vehicle body structure for movement between an open position exposing the vehicle interior and a closed position at least partially concealing the vehicle interior. A front door sensor is configured to detect movement of the front door between the closed and open positions. A rear door is movably connected to the vehicle body structure for movement between a closed position at least partially concealing a rear area of the vehicle interior and an open position exposing the rear area of the vehicle interior. A rear door sensor is configured to detect movement of the rear door between the closed and open positions. A shifter position sensor is configured to detect a current position of a transmission shifter. A vehicle speed sensor configured to detect a vehicle speed. An alerting device is configured to provide an indication that an object has potentially been left in the area of the vehicle interior. A controller is operably connected to each of the front door sensor, the rear door sensor, and the alerting device. The controller is configured to operate the alerting device to provide the indication based on the controller detecting a sequence of events in which the front door is detected to be moved to the open position prior to the rear door being moved to the open position. The operation of the alerting device by the controller is not based on a physical detection of a presence of the object.

Also other objects, features, aspects and advantages of the disclosed vehicle activity monitoring system will become apparent to those skilled in the art from the following detailed description, which, taken in conjunction with the annexed drawings, discloses exemplary embodiments of the vehicle activity monitoring system.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 is illustrated in accordance with an exemplary embodiment of the present invention. The vehicle 10 includes a vehicle body structure 12 that defines a vehicle interior 14 and includes a vehicle activity monitoring system 16 disposed within the vehicle 10. The vehicle interior 14 can be a passenger compartment within the vehicle 10 or can be the passenger compartment combined with a cargo area at a rear of the vehicle 10, depending upon the overall design and configuration of the vehicle 10.

Figure 1:
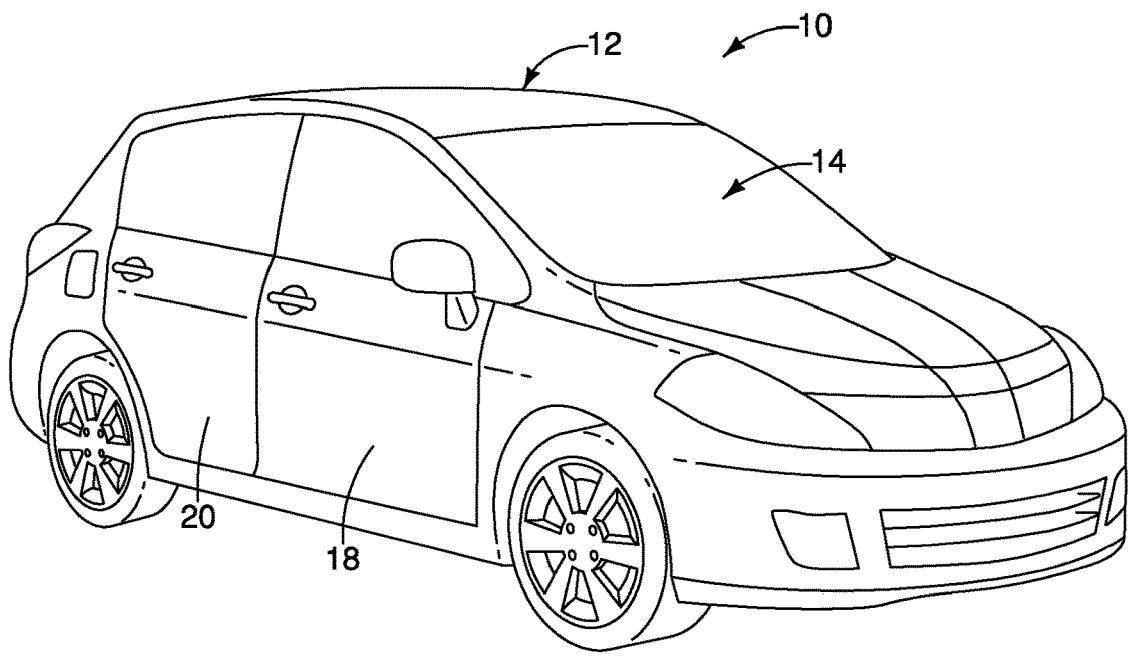
FIG. 1 is a perspective view of a vehicle having a front door, a rear doors and a vehicle activity monitoring system in accordance with an exemplary embodiment of the present invention.
Figure 2:
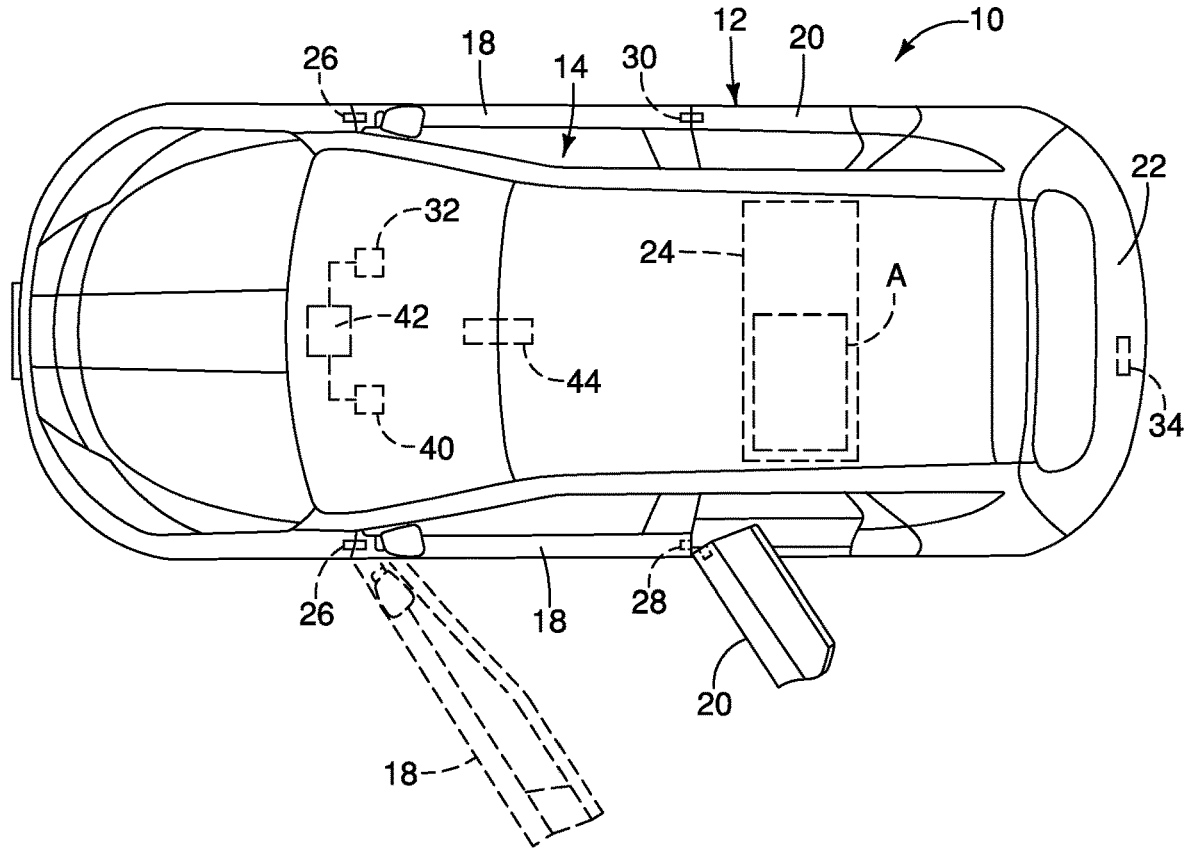
FIG. 2 is a top view of the vehicle of FIG. 1 in which a rear door is in an open position.
Figure 3:
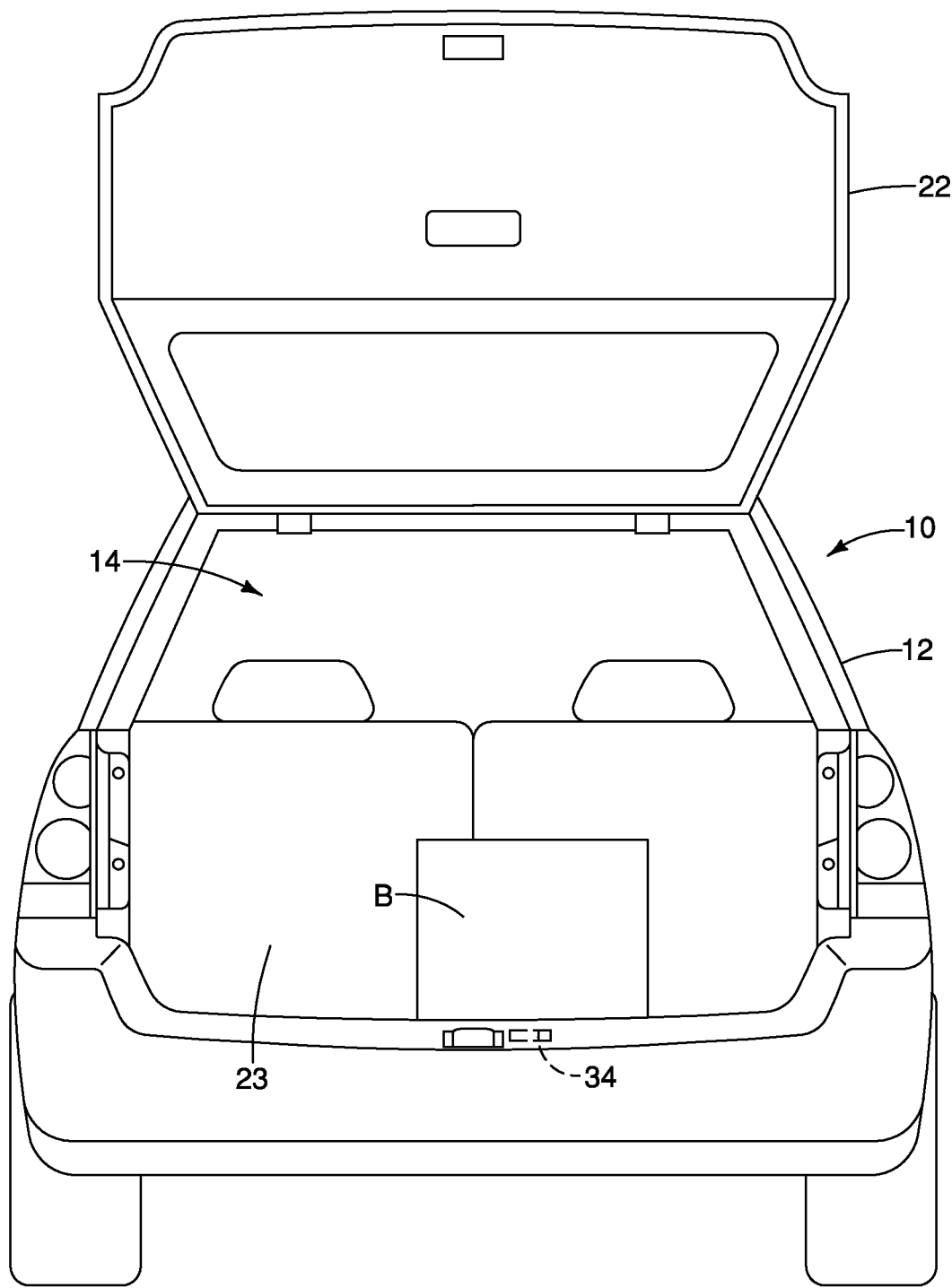
FIG. 3 is a rear elevational view of the vehicle of FIG. 1 in which a hatch door is in an open position.

As illustrated in FIGS. 1-3, the vehicle 10 is a hatchback vehicle that has four passenger access doors including two front doors 18, two rear doors 20 and a rear hatch door 22. The front doors 18 are movably connected to the vehicle body structure 12 for movement between an open position exposing the vehicle interior 14 and a closed position at least partially concealing the vehicle interior 14 in a conventional manner. Similarly, the rear doors 20 are movably connected to the vehicle body structure 12 for movement between a closed position at least partially concealing rear seats 24 of the vehicle interior 14 and an open position exposing the rear seats 24 within the vehicle interior 14. The area of the passenger compartment 14 having the rear seats 24 and accessed by the rear doors 20 is also referred to herein as a rear area of the vehicle interior 14. The rear hatch door 22 is movably connected to the vehicle body structure 12 for movement between an open position exposing a rear cargo area 23 of the vehicle interior 14 and a closed position at least partially concealing the rear cargo area 23 of the vehicle interior 14.

Figure 4:
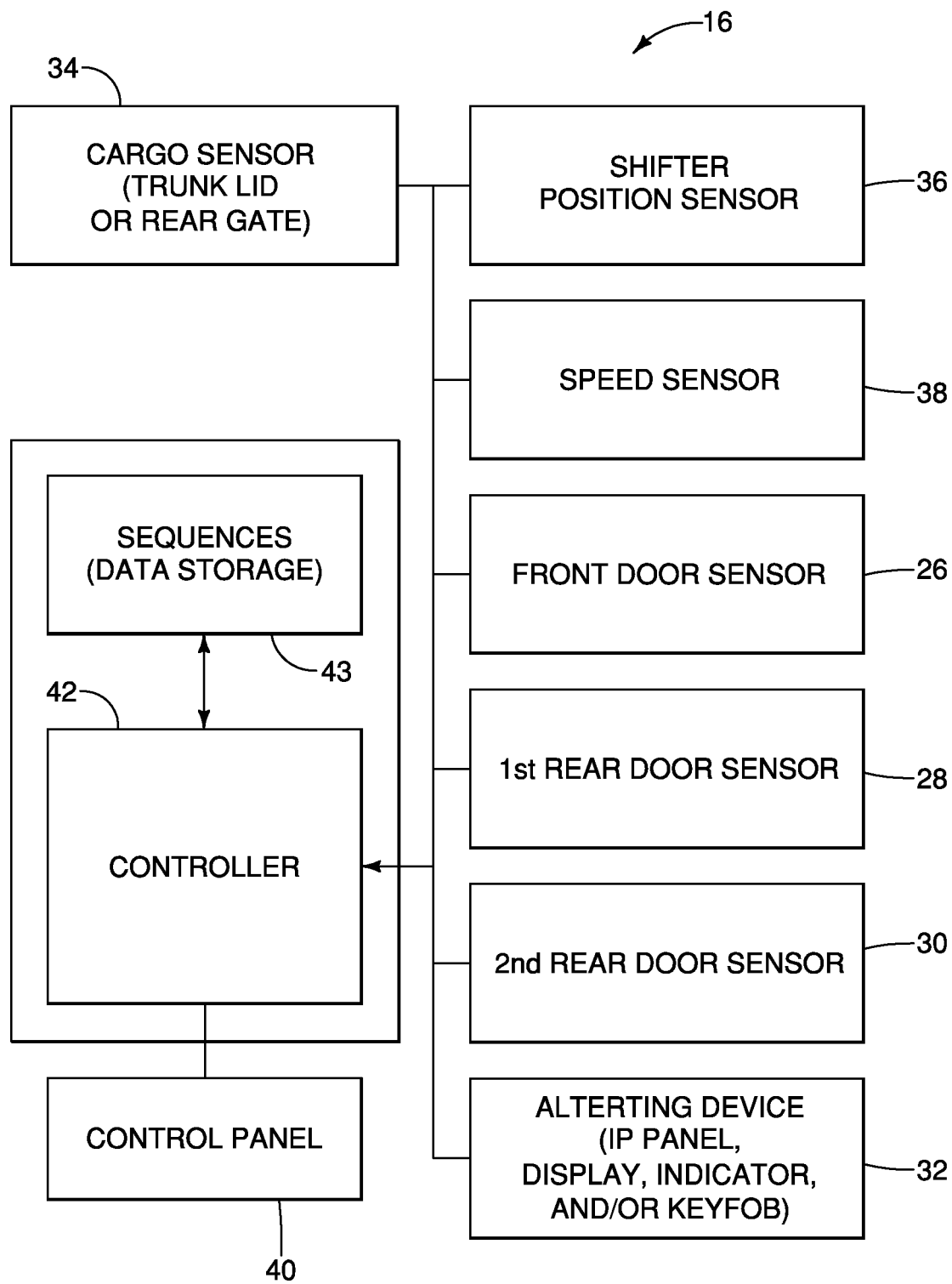
FIG. 4 is a block diagram illustrating elements of the vehicle activity monitoring system of FIG. 1.

As shown in FIG. 4, the vehicle activity monitoring system 16 includes a front door sensor 26, a first rear door sensor 28, a second rear door sensor 30, an alerting device 32, a rear hatch door sensor 34, a shifter position sensor 36, a speed sensor 38, a control panel 40 and a controller 42.

As shown in FIG. 2, the front door sensors 26 are installed relative to the front doors 18 such that the front door sensors 26 detect an opening movement of the front doors 18 and detects closing movement of the front doors 18. In other words, the front door sensor 26 is configured to sense movement of the front door 18 between the closed position and the open position.

The first rear door sensor 28 is installed relative to a first of the rear doors 20 such that the first rear door sensor 28 detects an opening movement of the first of the rear doors 20 and detects closing movement of the first of the rear doors 20. Similarly, the second rear door sensor 30 is installed relative to a second of the rear doors 20 such that the second rear door sensor 30 detects an opening movement of the second of the rear doors 20 and detects closing movement of the second of the rear doors 20. Further, the rear hatch door sensor 38 is installed relative to the rear hatch door 22 such that the rear hatch door sensor 34 detects an opening movement of the rear hatch door 22 and detects closing movement of the rear hatch door 22.

A vehicle component includes at least one of the rear doors 20 and the rear hatch door 22. A vehicle component sensor includes at least one of the first rear door sensor 28, the second rear door sensor 30 and the rear hatch door sensor 34. The vehicle component is movably connected to the vehicle body structure 12 for movement between a closed position at least partially concealing an area of the vehicle interior 14 and an open position exposing the area of the vehicle interior 14. The vehicle component sensor is configured to sense movement of the vehicle component between the closed position and the open position.

The alerting device 32, the shifter position sensor 36, the speed sensor 38, the control panel 40 and the controller 42 are installed within the vehicle body structure 12. Preferably, the alerting device 32, the control panel 40 and the controller 42 are installed within the instrument panel within the interior 14 of the vehicle 10. The shifter position sensor 36 can be installed within a transmission (not shown) of the vehicle 10, or can be installed within a transmission shifter structure 44 within the passenger compartment 14. The shifter position sensor 36 is configured to detect a current setting of a shifter mechanism, or transmission shifter, 44 of the transmission. For example, when the transmission is shifted from P (park) to D (drive), 2 (second gear), 1 (first gear) or R (reverse), the shifter position sensor 36 detects the movement and detects the current position or setting of the shifter mechanism 44.

The speed sensor 38 can be installed within the transmission or within the instrument panel of the vehicle 10. The speed sensor 38 is configured to detect a current speed of the vehicle 10.

In the logic employed by the controller 42 as described below, there are several steps where the controller 42 monitors the current position of the shifter mechanism 44 via signals from the shifter position sensor 36 and also monitors the current speed of the vehicle 10 via the speed sensor 38. In the description below, the shifter position sensor 36 and the speed sensor 38 are characterized such that the controller 42 monitors only one or the other of the shifter position sensor 36 and the speed sensor 38. However, it should be understood from the drawings and the description herein that the controller 42 can alternatively monitor both the shifter position sensor 36 and the speed sensor 38. In those steps where both the shifter position sensor 36 and the speed sensor 38 are mentioned, the controller 42 can use signals from just one of the shifter position sensor 36 and the speed sensor 38, or signals from both. Hence, only one of the shifter position sensor 36 and the speed sensor 38 is required for operation of the vehicle activity monitoring system 16. Specifically, the vehicle activity monitoring system 16 can include both the shifter position sensor 36 and the speed sensor 38, or can include only the shifter position sensor 36, or can include only the speed sensor 38.

The control panel 40 can include a visual display used by the controller 42 and also includes an inputting capability. For example, when the control panel 40 includes a visual display, the visual display can include touch screen technology, or a series of mechanical buttons that allow a vehicle occupant to select options. For example, the visual display of the control panel 40 can display prompts for the vehicle operator inquiring whether or not the vehicle operator wants the alert system to be enabled, or disabled. The visual display of the control panel 40 can also display visual alerts and/or text reminders of the possibility that an object or cargo has possibly been left in the vehicle interior 14, as is described in greater detail below.

The vehicle activity monitoring system 16 does not monitor activity related to the ignition switch (not shown) of the vehicle 10. More specifically, the logic (presented below) used by the vehicle activity monitoring system 16 in determining whether or not an object or cargo has possibly been left in the vehicle interior 14, such as adjacent to or on the rear seat 24 of the vehicle or in the rear cargo area 23, does not make use of the current operational state of the ignition switch, does not include an ignition switch sensor nor does the controller 42 monitor ignition switch activity. The vehicle activity monitoring system 16 does not monitor actions taken by the vehicle operator as they relate to operation of the ignition switch. In other words, the vehicle activity monitoring system 16 operates without regard for the status of the ignition switch of the vehicle 10. Put another way, the vehicle activity monitoring system 16 uses logic and monitors actions in the absence of any actions relating to the ignition switch.

Further, the vehicle activity monitoring system 16 does not include any type of occupancy sensor, such as a microphone, temperature sensor, seat weight sensor, movement sensor or any other type of sensor that is primarily configured to detect the presence or absence of an occupant within the vehicle 10. More specifically, the logic (presented below) used by the vehicle activity monitoring system 16 in determining whether or not an object or cargo has been left adjacent to or on the rear seat 24 or in the rear cargo area 23 of the vehicle interior 14 does not make use of any kind of occupancy sensor nor does the controller 42 monitor occupancy related sensors. Rather, the vehicle activity monitoring system 16 monitors opening and closing movements of the front and rear doors 18 and 20, and the rear hatch door 22 (or trunk lid) and monitors the current status of the shifter mechanism 36 and/or current speed of the vehicle 10. In other words, the controller 42 does not need to employ sensors in a vehicle other than sensors that are already present in a vehicle that does not include the vehicle activity monitoring system 16. Specifically, with or without the vehicle activity monitoring system 16, the vehicle 10 includes the front door sensors 26, the rear door sensors 28 and 30, the cargo sensor 34, the shifter position sensor 36 and the speed sensor 38 as part of the original equipment of the vehicle 10.

The alerting device 32 can be any of a variety of devices, such as a conventional vehicle security alarm or can be a dedicated alarm device installed within the vehicle 10 and configured to operate solely with the controller 42 in a manner described in greater detail below. Further, the alerting device 32 can include a display 52 (FIGS. 6 and 7) installed to the instrument panel within the vehicle interior 14 and the alarm signal includes a visual signal provided on the display. Alternatively, the alerting device 32 can work in concert with the visual display 52 of the control panel 40 to display visual alerts or indications to inform the vehicle operator that an object or cargo may possibly be present beside or on the rear seat 24 or in the rear cargo area 23 of the vehicle interior 14 of the vehicle 10. More specifically, the alerting device 32 provides an indication, such as an alarm, or alert, signal, including an audible alert or sound and/or a visual alert. Alternatively, the alerting device 32 can be included in a keyfob (not shown) that is configured to remotely lock and unlock the doors 18 and 20. The keyfob (not shown) can be configured to provide an indication, such as an audible alarm and/or a vibration (vibratory alert), that also serves as an alarm or alert to the vehicle operator. Further, the vehicle 10 can be provided with the alerting device 32 as described above, installed within the vehicle 10, in concert with the separate handheld keyfob (not shown) typically kept in the vehicle operator's pocket or purse.

A description of operations of the controller 42 is now described with reference to FIG. 4 and the logic steps set forth in FIGS. 5, 8A and 8B. As shown in FIG. 4, the controller 42 is operably connected to each of the front door sensors 26, the rear door sensors 28 and 30, the alerting device 32, the rear hatch door sensor 34, the shifter position sensor 36, the speed sensor 38 and the control panel 40. The controller 42 also includes a data storage portion 43 that stores data, such as activity related information (activity related sequence data) and display information for the visual display of the control panel 40, as is described in greater detail below.

The controller 42 is configured such that in response to the controller 42 detecting and determining that a predetermined sequence of activity events has occurred, the controller 42 operates the alerting device 32 and/or the control panel 40 to provide the indication, such as an alarm or alert signal, to the vehicle operator. The predetermined sequence of activity events is based on opening movement and closing movement of the front door(s) 18 as detected via signals from the front door sensors 26, and opening movement and closing movement of the vehicle component. The vehicle component being one or both of the rear doors 20 with movement thereof detected via signals from the sensors 28 and 30 or the rear hatch door 22 with movement thereof detected via signals from the sensor 34. Some of the activity events, or the sequence of events, also include determining whether or not the vehicle 10 is in motion via the speed sensor 38, and/or whether or not the vehicle 10 is in P (Park) or not in P (park) via the shifter position sensor 36.

However, it should be understood from the drawings and the description herein that the controller 42 is specifically designed and configured such that there is no detection or monitoring of actions relating to operation of the vehicle ignition device. In other words, the activity monitoring actions and alert producing actions of the controller 42 completely ignore any actions relating to an ignition switch of the vehicle 10. The controller 42 makes no distinction between the engine of the vehicle 10 being operated and the engine of the vehicle 10 not being operated with regard to monitoring of vehicle activity. Using the detected sequence of events, the controller 42 determines whether or not the vehicle operator has potentially placed an object or cargo A (FIG. 2) adjacent to or on the rear seat 24 of the vehicle 10 and/or an object or cargo B (FIG. 3) in the rear cargo area 23 in the vehicle interior 14. In response to determining that the vehicle operator has potentially left the object or cargo A and/or B adjacent to or on the rear seat 24 or in the rear cargo area 23, respectively, of the vehicle interior 14, the controller 42 operates the alerting device 32 and/or the control panel 40 to provide an indication, such as an alarm or alert signal, to the vehicle operator warning the vehicle operator that the object A and/or B appears to still be in the area (i.e., adjacent to or on the rear seat 24 or in the rear cargo area 23) of the vehicle interior 14.

The control panel 40 can also include control mechanisms or mechanical switches (not shown) that are configured to be manually operated by the vehicle operator such that the vehicle operator can manually activate and de-activate the vehicle activity monitoring system 16. The control panel 40 can be a separate panel of the instrument panel (not shown) of the vehicle 10, or can be part of other input systems incorporated into the instrument panel, such as a vehicle operation monitoring system. As mentioned above, the vehicle 10 can be provided with a means for activating and de-activating the vehicle activity monitoring system 16 that is part of the control panel 40 or, for example, the instrument panel of the vehicle 10 can be provided with a switch and/or separately an interactive display 52 (FIGS. 6 and 7) that includes a menu for activating and de-activating the vehicle activity monitoring system 16.

Figure 5:
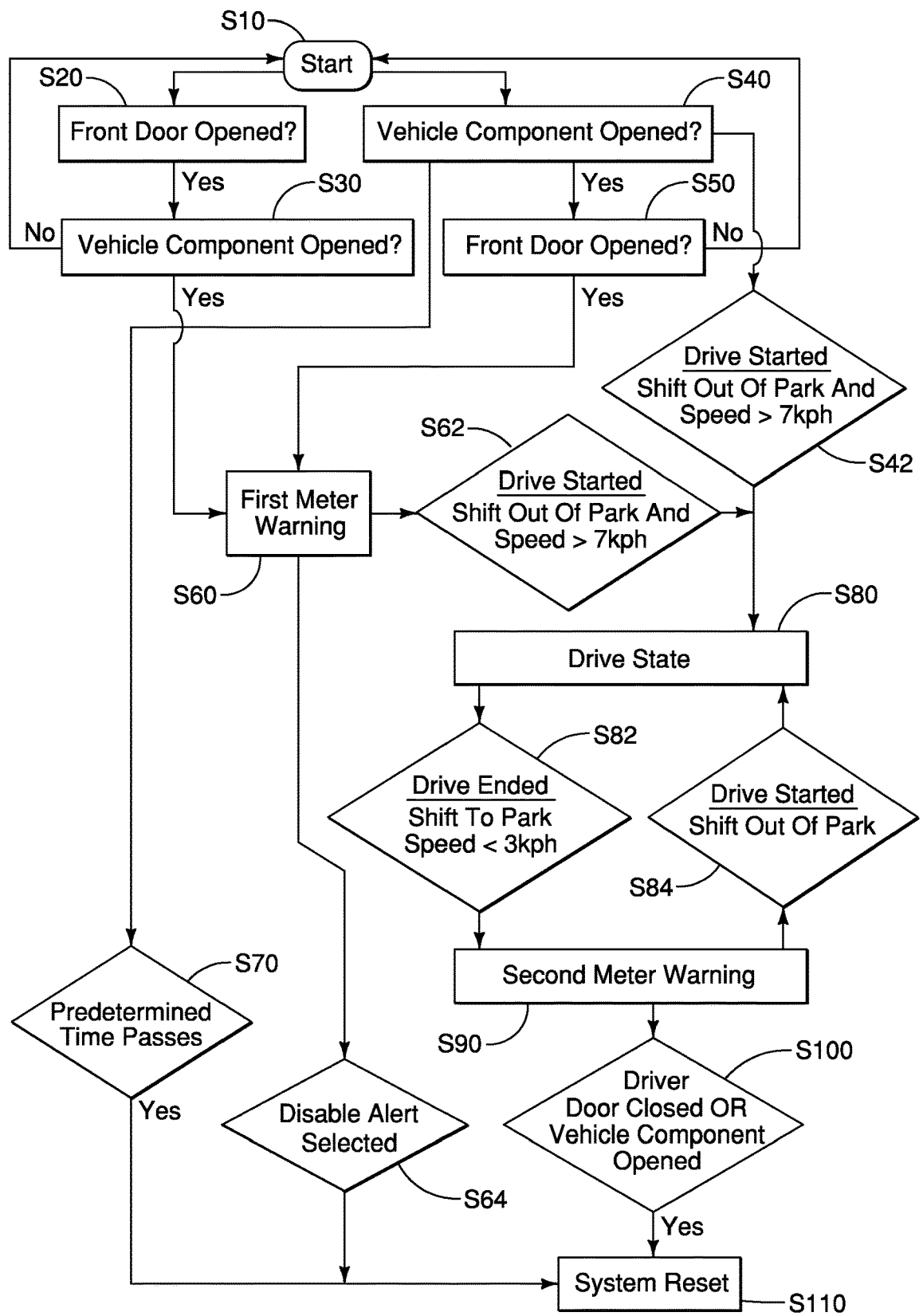
FIG. 5 is a flowchart illustrating generation of a visual alert by the vehicle activity monitoring system of FIG. 1.
Figure 8A:
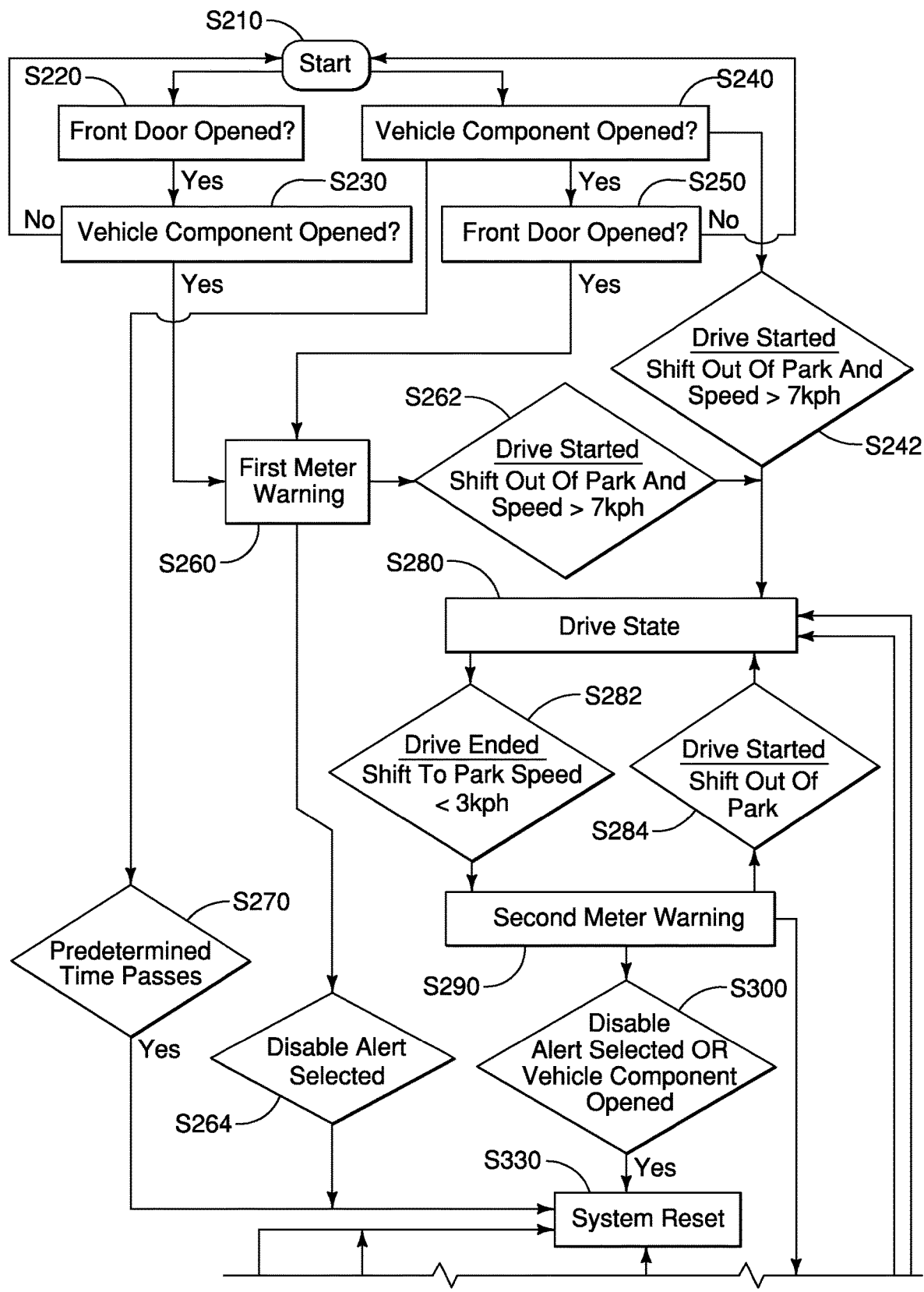
FIGS. 8A and 8B are flowcharts illustrating generation of visual and audible alerts by the vehicle activity monitoring system of FIG. 1.
Figure 8B:
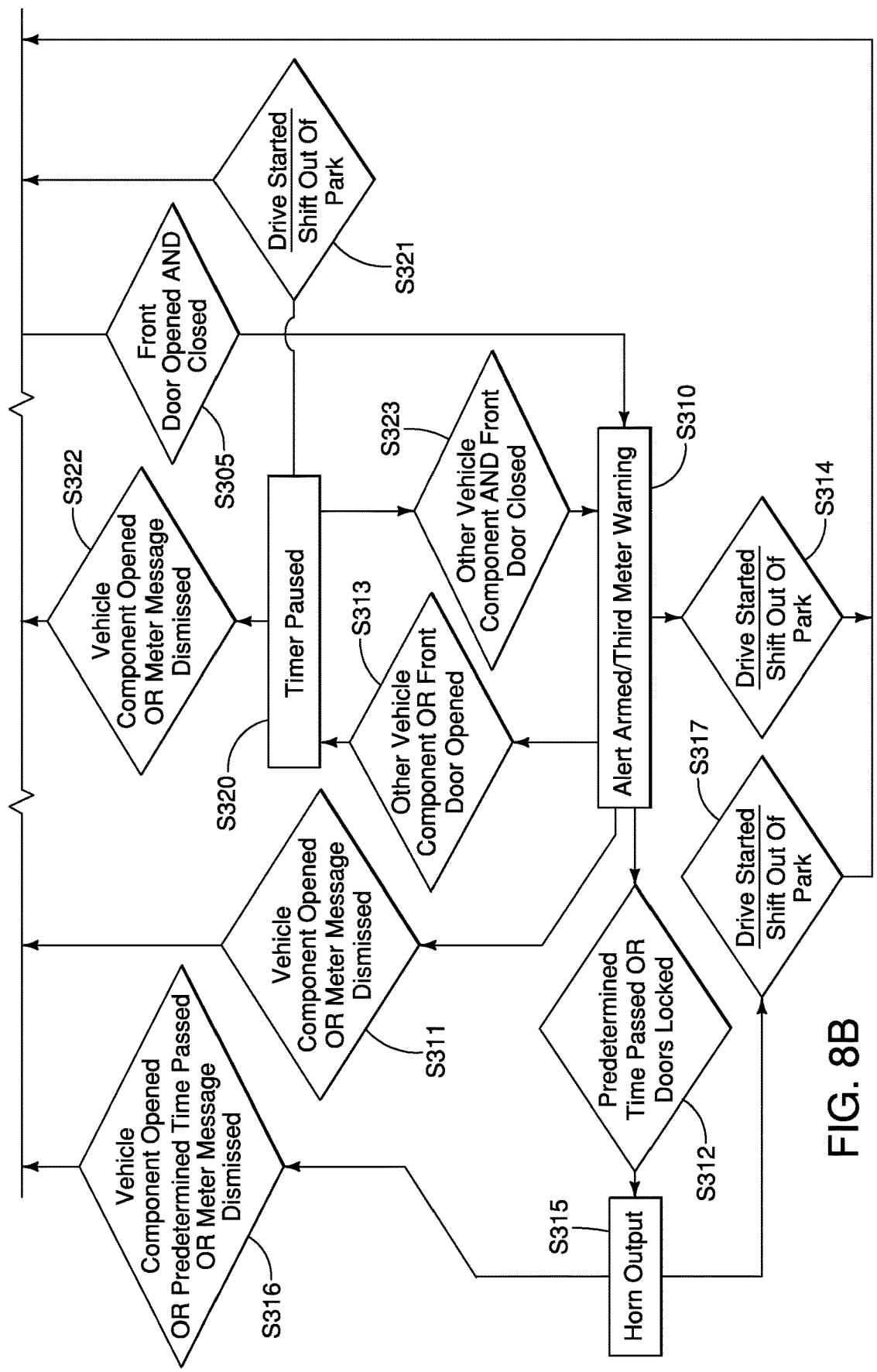

FIGS. 5, 8A and 8B illustrate examples of basic logic used in the operation of the vehicle activity monitoring system 16. The operating mode of the vehicle activity monitoring system 16 can be set through selections presented on the display 52 of the control panel 40. The vehicle activity monitoring system 16 can be set to operate in an "alert and horn" mode as shown in FIGS. 8A and 8B, in an "alert only" mode as shown in FIG. 5, or can be set "off" to not operate.

When the vehicle activity monitoring system 16 is set in the "alert and horn" mode (FIGS. 8A and 8B) or the "alert only" mode (FIG. 5), the controller 42 starts operating in response to any of a variety of factors, such as the keyfob (not shown) being in the proximity of the vehicle 10, or operation of the keyfob to unlock the doors of the vehicle 10. The controller 42 accesses the data storage portion 43 and determines whether or not the vehicle activity monitoring system 16 has been activated for operation by the vehicle operator, as manually selected via the control panel 40. When the vehicle activity monitoring system 16 is in an activated mode, then the operations depicted in either FIG. 5 or FIGS. 8A and 8B can proceed.

At step S10 of the vehicle activity monitoring system 16 of FIG. 5 when the vehicle activity monitoring system is in the "alert only" mode, the controller 42 goes through an initialization process in which all previously monitored movement activities are deleted, and monitoring of actions starts anew. Further, the controller 42 checks to see whether or not the vehicle operator has made an input via the control panel 44 to disable the vehicle activity monitoring system 16, or whether to change operation of the vehicle activity monitoring system to the "alert and horn" mode shown in FIGS. 8A and 8B.

The controller 42 then determines whether or not one of the front doors 18, one of the rear doors 20, or the rear hatch door 22 has been opened and then closed. When one of the front doors 18 is opened first, the process moves to step S20. When the vehicle component is opened first, which the controller 46 determines is a possible indication that cargo A has been placed adjacent to or on the rear seat 24 or cargo B has been placed in the rear cargo area 23 of the vehicle 10, the process moves to step S40.

When one of the front doors 18 is opened first, the controller 42 then determines whether or not the vehicle component has been opened and then closed after the opening and closing of one of the front doors 18. When the vehicle component, such as one of the rear doors 20 or the rear hatch door 22, is opened and then closed in step S30, after one of the front doors is opened and then closed in step S20, the process moves to step S60.

When the vehicle component is opened first, the controller 42 then determines whether or not one of the front doors 18 has been opened and then closed after the opening and closing of the vehicle component. When one of the front doors 18 is opened and then closed in step S50, after the vehicle component is opened and then closed in step S40, the process moves to step S60. When one of the front doors 18 is not opened within a predetermined amount of time in step S70, such as ten minutes, the process moves to step S110 in which the system is reset. When one of the front doors 18 is not opened and closed after opening and closing of the vehicle component in step S40, the vehicle activity monitoring system 16 determines that the vehicle 10 is not being operated so the vehicle activity monitoring system 16 is not required to be activated.

When the vehicle component is opened first in step S40, the process moves to step S42 when the controller 42 determines that the shifter mechanism 44 has been moved out of the P (Park) setting and that the vehicle speed is greater than a predetermined speed. Any suitable speed can be used, such as seven kilometers per hour or five miles per hour. When both conditions are met from step S40 without being followed by opening and closing of one of the front doors 18 (step S50) and without a predetermined amount of time having passed (step S70), the controller 42 moves to step S80 where the vehicle is designated by the controller 42 as being in the "Drive State," as shown in FIG. 5. The predetermined amount of time in step S70 can be any suitable time period, such as ten minutes.

Figure 6:
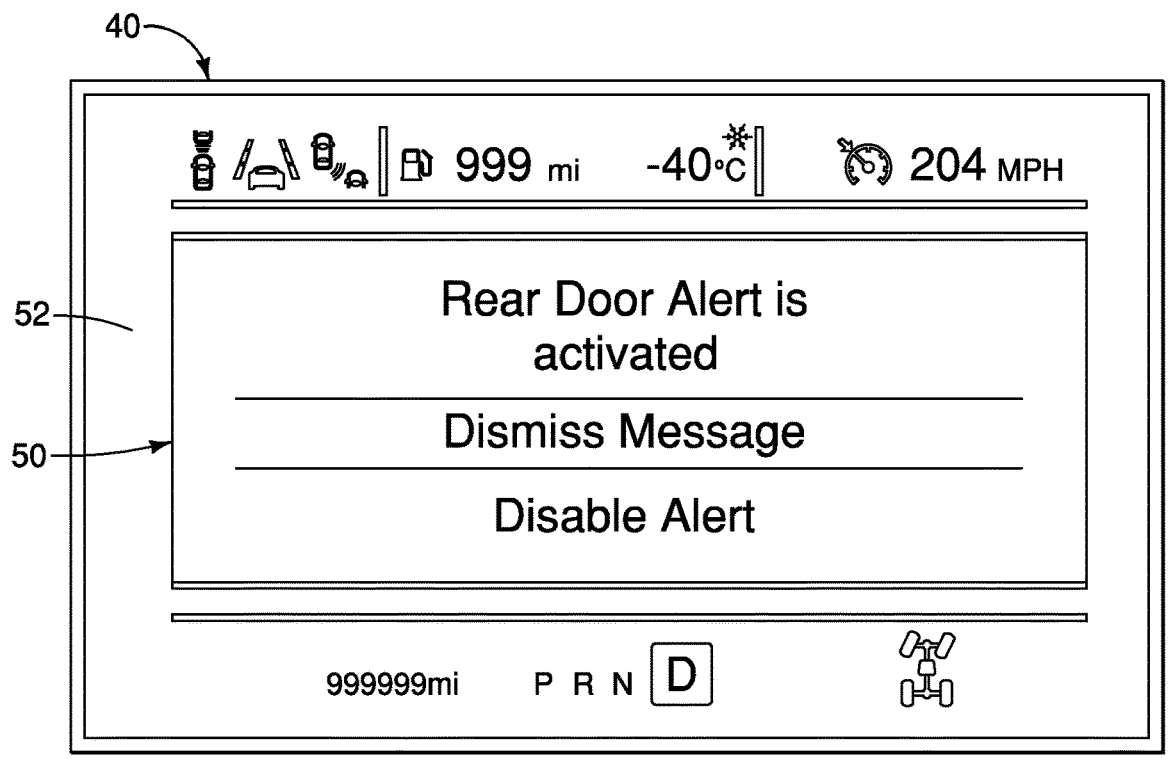
FIG. 6 is a first visual alert generated by the vehicle activity monitoring system of FIG. 5.

At step S60, the controller 42 activates the vehicle activity monitoring system 16 responsive to the monitored vehicle activity. The controller 42 provides a first meter warning 50 on a display 52 of the control panel 40, as shown in FIG. 6. The first meter warning 50 provides the driver with selectable options, such as activating or disabling the alert. The first meter warning 50 can include, but is not limited to, the following prompts: "rear door alert is activated," "dismiss message" and "disable alert." Other prompts can also be included in the first meter warning 50. When cargo A has been placed adjacent to or on the rear seat 24 or cargo B has been placed in the rear cargo area 23 of the vehicle 10, the first meter warning 50 indicates that the "rear door alert is activated" or the "rear cargo door alert is activated," and the driver can select the "dismiss message" prompt to remove the first meter warning 50 from the display 52. When the driver is certain that cargo A has not been placed adjacent to or on the rear seat 24 or cargo B has not been placed in the rear cargo area 23 of the vehicle 10, the driver can select the "disable alert" prompt to disable the vehicle activity monitoring system 16. This moves the process to step S110, in which the system is reset. In other words, the controller 42 is set such that, depending upon subsequently monitored actions, the controller 42 can trigger the alerting device 32 to provide an indication, or alert warning, that cargo A may be adjacent to or on the rear seat 24 or cargo B may be in the rear cargo area 23. At this time (step S60), no alarm is triggered, but the actions monitored to arrive at step S60 cause the controller 42 to monitor activity that can trigger an alert.

From the first meter warning in step S60, the process moves to step S62 in which the controller 42 determines whether or not the shifter mechanism 44 has been moved out of the P (Park) setting and whether or not the vehicle speed is greater than a predetermined speed. Any suitable speed can be used, such as seven kilometers per hour or five miles per hour. When both conditions are met, the controller 42 moves to step S80 where the vehicle is designated by the controller 42 as being in the "Drive State," as shown in FIG. 5. When both conditions of step S62 are not met, the operation remains at step S60 until both conditions are met.

Once the vehicle activity monitoring system 16 has achieved the "Drive State" in step S80, the controller 42 continues to monitor the vehicle 10 to determine whether or not the vehicle 10 continues to be operated in the "Drive State." Specifically, at step S82, the controller 42 determines whether or not the shifter mechanism 44 has moved back to the P (Park) setting and whether or not the vehicle speed is less than a predetermined speed. The predetermined speed can be any suitable speed, such as three kilometers per hour or five miles per hour. When both conditions are not met, the vehicle 10 is determined as still being driven and remains in the "Drive State" of step S80. When both conditions are met, the operation moves to step S90 in which the controller 42 moves to a Second Meter Warning state. In the "Drive State" of step S80, opening the vehicle component, such as opening one of the rear doors 20 or the rear latch door 22 when the vehicle 10 is momentarily stopped, does not disable or cancel the vehicle activity monitoring system 16.

Figure 7:
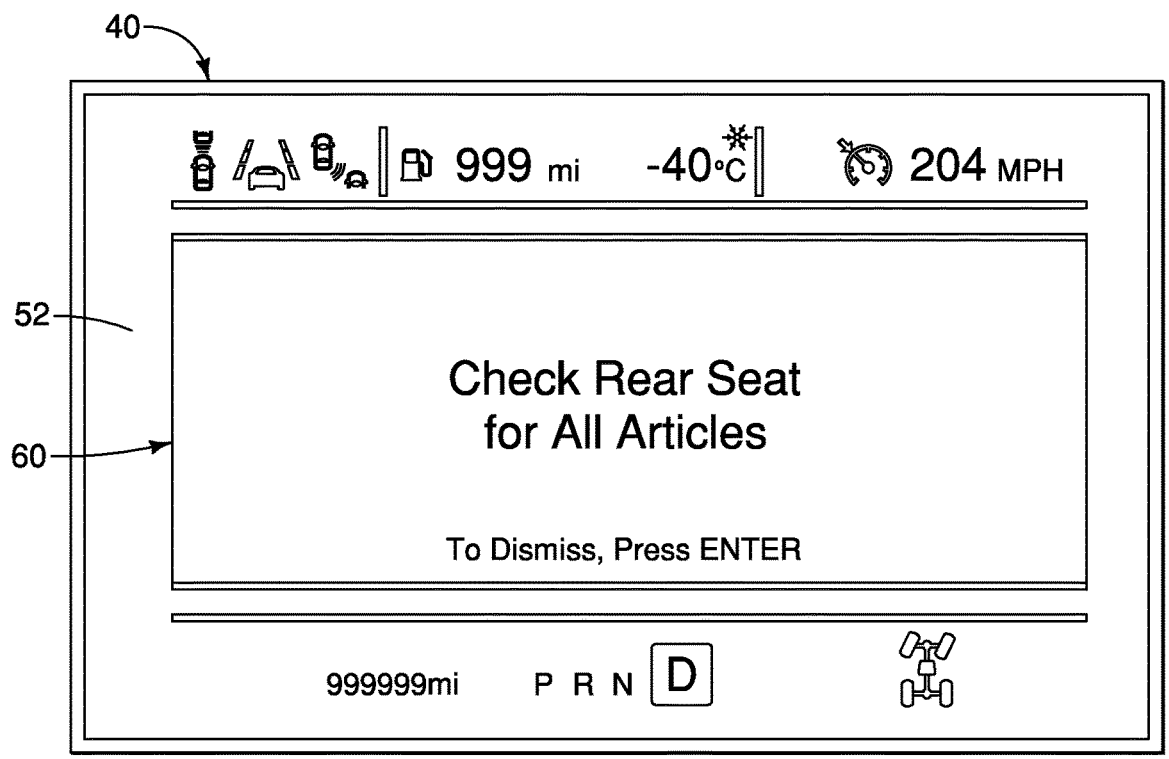
FIG. 7 is a second visual alert generated by the vehicle activity monitoring system of FIG. 5.

In the Second Meter Warning state of step S90, the controller 42 causes a prompt or text message to be displayed on the display 52 of the control panel 40, as shown in FIG. 7. The prompt can be any suitable message, such as "check rear seat for all articles" when the vehicle component is one of the rear door 20 or "check rear cargo area for all articles" when the vehicle component is the rear hatch door 22. As shown in FIG. 7, the prompt can be manually dismissed by the vehicle occupant by touching the display or instrument panel of the control panel 40.

Following the Second Meter Warning state of step S90, when the controller 42 determines that the shifter mechanism 44 has been shifted out of the P (park) setting or position (step S84), the operation returns to the "Drive State" of step S80. This indicates the vehicle 10 is being driven. The prompt provided by the Second Meter Warning state of step S90 is dismissed.

Following the Second Meter Warning state of step S90, when the controller 42 determines that either one of the front doors 20 is closed or the vehicle component is opened in step S100, the process moves to the system rest step S110. One of the front doors 20 being closed in step S100, indicates the occupant is no longer within the vehicle 10 such that the operation moves to the system reset step S110. When the vehicle component is opened in step S100, the cargo A placed adjacent to or on the rear seat 24 or the cargo B placed in the rear cargo area 23 of the vehicle 10 is accessible by the occupant such that the vehicle activity monitoring system 16 moves to the system reset step S110.

At step S210 of the vehicle activity monitoring system 16 of FIGS. 8A and 8B when the vehicle activity monitoring system is in the "alert and horn" mode, the controller 42 goes through an initialization process in which all previously monitored movement activities are deleted, and monitoring of actions starts anew. Further, the controller 42 checks to see whether or not the vehicle operator has made an input via the control panel 44 to disable the vehicle activity monitoring system 16, or whether to change operation of the vehicle activity monitoring system 16 to the "alert only" mode shown in FIG. 5.

The controller 42 then determines whether or not one of the front doors 18, one of the rear doors 20, or the rear hatch door 22 has been opened and then closed. When one of the front doors 18 is opened first, the process moves to step S220. When the vehicle component is opened first, which the controller 42 determines is a possible indication that cargo A has been placed adjacent to or on the rear seat 24 or cargo B has been placed in the rear cargo area 23 of the vehicle 10, the process moves to step S240. The vehicle component is consistent through the process illustrated in FIGS. 8A and 8B, such that when the rear door is the vehicle component in steps S230 or S250, the rear door is the vehicle component throughout the process. The other vehicle component, such as in steps S313 and S323, is a vehicle component other than the initial vehicle component, such as the rear hatch door in this example.

When one of the front doors 18 is opened first in step S220, the controller 42 then determines whether or not the vehicle component has been opened and then closed after the opening and closing of one of the front doors 18. When the vehicle component, such as one of the rear doors 20 or the rear hatch door 22, is opened and then closed in step S230, after one of the front doors 18 is opened and then closed in step S220, the process moves to step S260.

When the vehicle component is opened first, the controller 42 then determines whether or not one of the front doors 18 has been opened and then closed after the opening and closing of the vehicle component. When one of the front doors 18 is opened and then closed in step S250, after the vehicle component is opened and then closed in step S240, the process moves to step S260. When one of the front doors 18 is not opened within a predetermined amount of time in step S270, such as ten minutes, the process moves to step S330 in which the activity monitoring system 16 is reset. The vehicle activity monitoring system 16 determines that when one of the front doors 18 is not opened and closed after opening and closing of the vehicle component, that the vehicle is not being operated so the vehicle activity monitoring system 16 is not required to be activated.

When the vehicle component is opened first in step S240, the process moves to step S242 when the controller 42 determines that the shifter mechanism 44 has been moved out of the P (Park) setting and that the vehicle speed is greater than a predetermined speed. Any suitable speed can be used, such as seven kilometers per hour or five miles per hour. When both conditions are met from step S240 without being followed by opening and closing of one of the front doors 18 (step 250) and without a predetermined amount of time having passed (step S270), the controller 42 moves to step S280 where the vehicle is designated by the controller 42 as being in the "Drive State," as shown in FIG. 8A. The predetermined amount of time in step S270 can be any suitable time period, such as ten minutes.

At step S260, the controller 42 activates the vehicle activity monitoring system 16 responsive to the monitored vehicle activity. The controller 42 provides a first meter warning 50 on a display 52 of the control panel 40, as shown in FIG. 6. The first meter warning 50 provides the driver with selectable options, such as activating or disabling the alert. The first meter warning 50 can include, but is not limited to, the following prompts: "rear door alert is activated," "dismiss message" and "disable alert." Other prompts can also be included in the first meter warning 50. When cargo A has been placed adjacent to or on the rear seat 24 or cargo B has been placed in the rear cargo area 23 of the vehicle 10, the first meter warning 50 indicates that the "rear door alert is activated" or that the "rear hatch door alert is activated," respectively, and the driver can select the "dismiss message" prompt to remove the first meter warning 50 from the display 52. When the driver is certain that cargo A has not been placed adjacent to or on the rear seat 24 or that cargo B has been placed in the rear cargo area 23 of the vehicle 10, the driver can select the "disable alert" prompt to disable the vehicle activity monitoring system 16. This moves the process to step S330, in which the system is reset. In other words, the controller 42 is set such that, depending upon subsequently monitored actions, the controller 42 can trigger the alerting device 32 to provide an alert warning that there may be cargo adjacent to or on the rear seat 24 or in the rear cargo area 23. At this time (step S260), no alarm is triggered, but the actions monitored to arrive at step S260 cause the controller 42 to monitor activity that can trigger an alert.

From the first meter warning in step S260, the process moves to step S262 in which the controller 42 determines whether or not the shifter mechanism 44 has been moved out of the P (Park) setting and whether or not the vehicle speed is greater than a predetermined speed. Any suitable speed can be used, such as seven kilometers per hour or five miles per hour. When both conditions are met, the controller 42 moves to step S280 where the vehicle is designated by the controller 42 as being in the "Drive State," as shown in FIG. 8A. When both conditions of step S262 are not met, the operation remains at step S260 until both conditions are met.

Once the vehicle activity monitoring system 16 has achieved the "Drive State" in step S280, the controller 42 continues to monitor the vehicle 10 to determine whether or not the vehicle 10 continues to be operated in the "Drive State." Specifically, at step S282, the controller 42 determines whether or not the shifter mechanism 44 has moved back to the P (Park) setting and whether or not the vehicle speed is less than a predetermined speed. The predetermined speed can be any suitable speed, such as three kilometers per hour or five miles per hour. When both conditions are not met, the vehicle 10 is determined as being driven and remains in the "Drive State" of step S280. When both conditions are met, the operation moves to step S290 in which the controller 42 moves to a Second Meter Warning state. In the "Drive State" of step S280, opening the vehicle component, such as opening one of the rear doors 20 or the rear hatch door 22 when the vehicle 10 is momentarily stopped, does not disable the vehicle activity monitoring system 16.

In the Second Meter Warning state of step S290, the controller 42 provides the first meter warning 50 on the display 52 of the control panel 40, as shown in FIG. 6. When cargo A has been placed adjacent to or on the rear seat 24 or cargo B has been placed in the rear cargo area 23 of the vehicle 10, the first meter warning 50 indicates that the "rear door alert is activated" or that the "rear hatch door alert is activated," respectively, and the driver can select the "dismiss message" prompt to remove the first meter warning 50 from the display 52. When the driver is certain that cargo A has not been placed adjacent to or on the rear seat 24 or that cargo B has not been placed in the rear cargo area 23 of the vehicle 10, the driver can select the "disable alert" prompt (step 300) to disable the vehicle activity monitoring system 16. This moves the process to step S330, in which the system is reset. In other words, the controller 42 is set such that, depending upon subsequently monitored actions, the controller 42 can trigger the alerting device 32 to provide an alert warning that there may be cargo adjacent to or on the rear seat 24 or in the rear cargo area 23. At this time (step S290), no alarm is triggered, but the actions monitored to arrive at step S290 cause the controller 42 to monitor activity that can trigger an alert.

Following the Second Meter Warning state of step S290, when the controller 42 determines that the shifter mechanism 44 has been shifted out of the P (park) setting (step S284), the operation returns to the "Drive State" of step S280. The controller 42 determines that the vehicle 10 is being driven such that the operation returns to the "Drive State" of step S280. The prompt provided by the Second Meter Warning state of step S290 is dismissed.

Following the Second Meter Warning state of step S290, when the controller 42 determines that the vehicle component, such as one of the rear doors 20 or the rear hatch door 22, is opened in step S300, the process moves to the system rest step S330. When the vehicle component is opened in step S300, the cargo B placed adjacent to or on the rear seat 24 or in the rear cargo area 23 of the vehicle 10 is accessible by the occupant such that the vehicle activity monitoring system 16 can be reset in step S330. When the controller 42 determines that the "disable alert" prompt is selected to disable the vehicle activity monitoring system 16, the operation moves to step S330 in which the vehicle activity monitoring system 16 is reset.

Following the Second Meter Warning state of step S290, when the controller 42 determines in step S305 that one of the front doors 18 has been opened, the operation moves to step S310 in which the controller 42 moves into an Alert Armed/Third Meter Warning state. A timer starts upon entering the Alert Armed state of step S310. In the Third Meter Warning state of step S310, the controller 42 causes a prompt or text message to be displayed on the display 52 of the control panel 40, as shown in FIG. 7. The prompt can be any suitable message, such as "check rear seat for all articles" when the vehicle component is one of the rear doors 20 or "check rear cargo area for all articles" when the vehicle component is the rear hatch door 22. As shown in FIG. 7, the prompt can be manually dismissed by the vehicle occupant in step S311 by touching the display or instrument panel of the control panel 40, thereby moving the operation to step S311 in which the vehicle activity monitoring system 16 is reset. Opening the vehicle component (step S311) from the Alert Armed/Third Meter Warning state (step S310) moves the operation to step S311 in which the vehicle activity monitoring system 16 is reset. Manually dismissing the prompt through the control panel 40 or opening the vehicle component, such as one of the rear doors 20 or the rear hatch door 22, indicates that the occupant is aware of the potential object in the vehicle interior. When the vehicle component is opened in step S100, the cargo A placed adjacent to or on the rear seat 24 or the cargo B placed in the rear cargo area 23 of the vehicle 10 is accessible by the occupant such that the vehicle activity monitoring system 16 can be reset in step S330.

Figure 9:
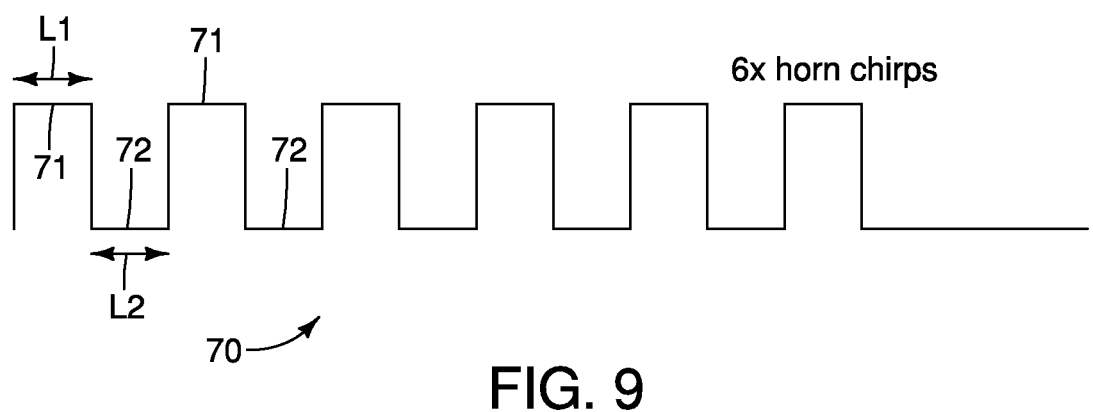
FIG. 9 is an illustration of an audible alert generated by the vehicle activity monitoring system of FIGS. 8A and 8B.

Following the Alert Armed state of step S310, when the controller 42 determines that a predetermined amount of time, such as eight seconds, has passed or determines that the doors of the vehicle are locked in step S312, then the process moves to step S315 in which an audible alert, such as an alarm, is generated. Any suitable alarm can be generated, such as the horn alarm 70 shown in FIG. 9. The generated alarm 70 includes a first period 71 having a length L1 in which the horn alarm is generated, followed by a second period 72 having a length L2 in which the horn alarm is not generated. This pattern can be repeated any suitable number of times. For example, as shown in FIG. 9, a total of six horn alarms are generated, and the first five alarms are followed by a period of silence. Following the last horn alarm output, the alarm can go silent or the pattern can be repeated for a predetermined amount of time, such as 120 seconds, or can end after completing the pattern one time. The time lengths L1 and L2 can be any suitable length, such as 150 ms. The time periods L1 and L2 can be the same length, or can be different lengths.

Following the generated alert in step S315, when the controller 42 determines that the vehicle component is opened, that a predetermined amount of time has passed or that the prompt (FIG. 7) has been manually selected to dismiss the message in step S316, the system moves to step S330 in which the vehicle activity monitoring system 16 is reset, as shown in FIGS. 8A and 8B. The generated audible alert is stopped when the operation moves to the reset step S330. The predetermined amount of time can be any suitable amount of time, such as 120 seconds.

Following the generated audible alert in step S315, when the controller 42 determines that the shifter mechanism 44 has been shifted out of the P (park) setting (step S317), the operation returns to the "Drive State" of step S280, as shown in FIGS. 8A and 8B. The controller 42 determines that the vehicle 10 is being driven, such that the operation returns to the "Drive State" of step S280. The prompt provided by the Third Meter Warning state of FIG. 7 is dismissed and the audible alarm generated in step S315 is stopped. By returning the process to the "Drive State" of step S280, the vehicle activity monitoring system 16 remains in an activated state.

Following the Alert Armed/Third Meter Warning state of step S310, when the controller 42 determines that the shifter mechanism 44 has been shifted out of the P (park) setting (step S314), the operation returns to the "Drive State" of step S280. The controller 42 determines that the vehicle 10 is being driven, such that the operation returns to the "Drive State" of step S280. The prompt provided by the Third Meter Warning state of FIG. 7 is dismissed and the timer started in step S310 is stopped. By returning the process to the "Drive State" of step S280, the vehicle activity monitoring system 16 remains in an activated state.

Following the start of the timer in the Alert Armed/Third Meter Warning state of step S310, the timer is paused in step S320 when the front door 18 or the other vehicle component is opened in step S313, as shown in FIG. 8B. The timer is paused as the vehicle operator opens doors other than the vehicle component. For example, when the vehicle component is one of the rear doors 20, opening one of the front doors 18 or the rear cargo hatch 22 pauses the time. Following the timer being paused in step S320, when the controller 42 determines that the shifter mechanism 44 has been shifted out of the P (park) setting (step S321), the operation returns to the "Drive State" of step S280. The controller 42 determines that the vehicle 10 is being driven, and operation returns to the "Drive State" of step S280. The prompt provided by the Third Meter Warning state of FIG. 7 is dismissed. By returning the process to the "Drive State" of step S280, the vehicle activity monitoring system 16 remains in an activated state.

Following the timer being paused in step S320, when the controller 42 determines in step S322 that the vehicle component is opened or that the prompt provided by the Third meter Warning state of FIG. 7 is dismissed, the operation moves to step S330 in which the vehicle activity monitoring system is reset.

Following the timer being paused in step S320, when the controller 42 determines in step S323 that the other vehicle component and one of the front doors 18 are closed, the operation moves back to Alert Armed/Third Meter Warning state of step S310 and the timer is started anew.

The logic presented in FIGS. 5, 8A and 8B are examples of the logic that is used by the controller 42 to operate the alerting device 32 to provide an indication that an object has potentially been left in the area of the vehicle interior. The alerting device 32 is operated by the controller 42 to provide an indication to the vehicle operator that cargo is adjacent to or on the rear seat 24 or in the rear cargo area 23, based on the controller 42 detecting a sequence of events including a sequence of events in which the front door 20 is detected to be moved to the open position (shown with dashed lines in FIG. 2) prior to the vehicle component being moved to the open position. The operation of the alerting device 32 by the controller 42 is not based on a physical detection of a presence of the object, such as with an occupancy sensor, including a microphone, a temperature sensor, a seat weight sensor, a movement sensor, or any other sensor configured to detect the presence or absence of an occupant within the vehicle. The operation of the alerting device 32 by the controller is not based on detection of conditions of an ignition switch of the vehicle 10 or detection of the operating state of an engine of the vehicle 10.

The controller 42 preferably includes a microcomputer with an activity monitoring and recording control program that controls the alerting device 32. The controller 42 can also include other conventional components, such as an input interface circuit, an output interface circuit, and storage devices, such as a ROM (Read Only Memory) device and a RAM (Random Access Memory) device. The microcomputer of the controller 42 is programmed to control the vehicle activity monitoring system 16. The memory circuit stores processing results and control programs, such as ones for monitoring, recording, evaluating and processing operations that are run by the processor circuit. The internal RAM of the controller 42 stores statuses of operational flags and various control data, and can define the data storage portion, which stores the qualifying sequences. The internal ROM of the controller 42 stores the programming for various operations. It will be apparent to those skilled in the art from this disclosure that the precise structure and algorithms for the controller 42 can be any combination of hardware and software that will carry out the functions of the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle activity monitoring system. Accordingly, these terms, as utilized to describe the present invention should be interpreted relative to a vehicle equipped with the vehicle activity monitoring system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle activity monitoring system, comprising:
a vehicle body structure defining a vehicle interior;
a vehicle front door movably connected to the vehicle body structure for movement between an open position exposing the vehicle interior and a closed position at least partially concealing the vehicle interior;
a front door sensor configured to detect movement of the front door between the closed and open positions;
a vehicle component movably connected to the vehicle body structure for movement between a closed position at least partially concealing an area of the vehicle interior and an open position exposing the area of the vehicle interior;
a vehicle component sensor configured to detect movement of the vehicle component between the closed and open positions;
a shifter position sensor configured to detect a current position of a transmission shifter, and a speed sensor is configured to detect a current speed of the vehicle;
an alerting device configured to provide an indication that an object has potentially been left in the area of the vehicle interior, the alerting device including a display installed within an instrument panel within the vehicle interior, the indication being at least a visual alert displayed on the display; and
a controller operably connected to each of the front door sensor, the vehicle component sensor, and the alerting device,
the controller being configured to operate the alerting device to provide the indication based on the controller detecting a sequence of events in which the front door is detected to be moved to the open position prior to the vehicle component being moved to the open position, the operation of the alerting device by the controller not being based on a physical detection of a presence of the object, and
a first visual indication being provided on the display prior to the shifter position sensor and the speed sensor detecting a predetermined shifter position and a predetermined speed, respectively, that the vehicle activity monitoring system is activated when the sequence of events is detected by the controller.

2. The vehicle activity monitoring system according to claim 1, wherein
the vehicle component is a rear door, and the area is a rear area of the vehicle interior.

3. The vehicle activity monitoring system according to claim 1, wherein
the vehicle component is a rear hatch door, and the area is a cargo area of the vehicle interior.

4. The vehicle activity monitoring system according to claim 1, wherein
the indication is an audible alert.

5. The vehicle activity monitoring system according to claim 1, wherein
the predetermined shifter position is not in a park position and the predetermined speed is greater than seven kilometers per hour.

6. The vehicle activity monitoring system according to claim 5, wherein
the controller is configured to cause an audible alert to be output after the vehicle activity monitoring system is activated, after the vehicle speed sensor detects that the vehicle has exceeded the predetermined speed and after the shifter position sensor detects that the transmission shift is in the park position when the front door sensor detects the front door moved from the closed position to the open position and back to the closed position without the vehicle component sensor detecting the vehicle component being moved from the closed position to the open position within a predetermined amount of time.

7. The vehicle activity monitoring system according to claim 6, wherein
the audible alert is stopped when the shifter position sensor detects that the transmission shifter is moved out of the park position.

8. The vehicle activity monitoring system according to claim 6, wherein
a timer determines whether the predetermined amount of time has passed, the timer being paused when the front door sensor detects the front door is moved to the open position.

9. The vehicle activity monitoring system according to claim 8, wherein
the timer restarts determining the predetermined amount of time when the front door is moved from the open position to the closed position.

10. The vehicle activity monitoring system according to claim 9, wherein
the timer is canceled when the shifter position sensor detects that the transmission shifter is moved out of the park position.

11. The vehicle activity monitoring system according to claim 1, wherein
a second visual indication is provided on the display when the shifter position sensor detects the transmission shifter in a park position after the vehicle exceeds the predetermined speed and after the vehicle activity monitoring system is activated, the second visual indication being a message to check the area for the object.

12. The vehicle activity monitoring system according to claim 11, wherein
the vehicle activity monitoring system is not canceled when the vehicle component sensor detects that the vehicle component is moved to the open position after the vehicle speed sensor detects the vehicle has exceeded the predetermined speed and before the shifter position sensor detects that the transmission shifter is in the park position.

13. A vehicle activity monitoring system, comprising:
a vehicle body structure defining a vehicle interior;
a vehicle front door movably connected to the vehicle body structure for movement between an open position exposing the vehicle interior and a closed position at least partially concealing the vehicle interior;
a front door sensor configured to detect movement of the front door between the closed and open positions;
a rear door movably connected to the vehicle body structure for movement between a closed position at least partially concealing a rear area of the vehicle interior and an open position exposing the rear area of the vehicle interior;
a rear door sensor configured to detect movement of the rear door between the closed and open positions;
a shifter position sensor configured to detect a current position of a transmission shifter;
a vehicle speed sensor configured to detect a vehicle speed;
an alerting device configured to provide an indication that an object has potentially been left in the area of the vehicle interior, the alerting device including a display installed within an instrument panel within the vehicle interior; and a controller operably connected to each of the front door sensor, the rear door sensor, and the alerting device, the controller being configured to operate the alerting device to provide the indication based on the controller detecting a sequence of events in which the front door is detected to be moved to the open position prior to the rear door being moved to the open position, the operation of the alerting device by the controller not being based on a physical detection of a presence of the object, and a visual alert being provided on the display when the shifter position sensor detects the transmission shifter in the park position after operation of the vehicle engine and the vehicle speed sensor detects the vehicle speed exceeding a predetermined speed and after the vehicle activity monitoring system is activated, the visual alert being a message to check the rear area for the object.

14. The vehicle activity monitoring system according to claim 13, wherein the vehicle activity monitoring system is not canceled when the vehicle component sensor detects that the rear door is moved to the open position after the vehicle speed sensor detects the vehicle speed exceeding the predetermined speed and before the shifter position sensor detects that the transmission shifter is in the park position.

15. The vehicle activity monitoring system according to claim 13, wherein the controller being configured to cause an audible alert to be output after the vehicle activity monitoring system is activated, after the vehicle speed sensor detects that the vehicle speed has exceeded the predetermined speed and after the shifter position sensor detects that the transmission shifter is in the park position when the front door sensor detects the front door moved from the closed position to the open position and back to the closed position without the rear door sensor detecting the rear door being moved from the closed position to the open position within a predetermined amount of time.

16. The vehicle activity monitoring system according to claim 15, wherein the audible alert is stopped when the shifter position sensor detects that the transmission shifter is moved out of the park position.

17. A vehicle activity monitoring system, comprising:

a vehicle body structure defining a vehicle interior;

a vehicle front door movably connected to the vehicle body structure for movement between an open position exposing the vehicle interior and a closed position at least partially concealing the vehicle interior;

a front door sensor configured to detect movement of the front door between the closed and open positions;

a vehicle component movably connected to the vehicle body structure for movement between a closed position at least partially concealing an area of the vehicle interior and an open position exposing the area of the vehicle interior;

a vehicle component sensor configured to detect movement of the vehicle component between the closed and open positions;

a shifter position sensor configured to detect a current position of a transmission shifter, and a speed sensor is configured to detect a current speed of the vehicle;

an alerting device configured to provide an indication that an object has potentially been left in the area of the vehicle interior; and a controller operably connected to each of the front door sensor, the vehicle component sensor, and the alerting device, the controller being configured to operate the alerting device to provide the indication based on the controller detecting the vehicle component being moved to the open position, the operation of the alerting device by the controller not being based on a physical detection of a presence of the object, the controller being further configured to operate the alerting device to cause an audible alert to be output after the vehicle activity monitoring system is activated, after the vehicle speed sensor detects that the vehicle speed has exceeded the predetermined speed and after the shifter position sensor detects that the transmission shifter is in the park position when the front door sensor detects the front door moved from the closed position to the open position and back to the closed position without the vehicle component sensor detecting the vehicle component being moved from the closed position to the open position within a predetermined amount of time.

18. The vehicle activity monitoring system according to claim 17, wherein the audible alert is stopped when the shifter position sensor detects that the transmission shifter is moved out of the park position.

19. The vehicle activity monitoring system according to claim 17, wherein the vehicle component is a rear door, and the area is a rear area of the vehicle interior.

20. The vehicle activity monitoring system according to claim 17, wherein the vehicle component is a rear hatch door, and the area is a cargo area of the vehicle interior.

* * * * *